United States Patent
Orford

(10) Patent No.: US 10,145,247 B2
(45) Date of Patent: Dec. 4, 2018

(54) ROTOR FOR A TURBO-MACHINE AND A RELATED METHOD

(71) Applicant: ROLLS-ROYCE PLC, London (GB)

(72) Inventor: Michael P Orford, Bristol (GB)

(73) Assignee: ROLLS-ROYCE plc, London (GB)

(*) Notice: Subject to any disclaimer, the term of this patent is extended or adjusted under 35 U.S.C. 154(b) by 763 days.

(21) Appl. No.: 14/602,599

(22) Filed: Jan. 22, 2015

(65) Prior Publication Data

US 2015/0240650 A1     Aug. 27, 2015

(30) Foreign Application Priority Data

Feb. 21, 2014 (GB) .................................. 1403072.0

(51) Int. Cl.
*F01D 5/22* (2006.01)
*F04D 29/32* (2006.01)
(Continued)

(52) U.S. Cl.
CPC .............. *F01D 5/22* (2013.01); *B23P 15/006* (2013.01); *F01D 5/225* (2013.01); *F04D 29/324* (2013.01);
(Continued)

(58) Field of Classification Search
CPC ... F01D 5/22; F01D 5/225; F01D 5/26; F01D 25/04; F01D 25/06; F04D 29/324;
(Continued)

(56) References Cited

U.S. PATENT DOCUMENTS

| 2,198,784 A | 4/1940 | Mikina |
| 3,216,699 A * | 11/1965 | Schoenborn .............. F01D 5/22 416/190 |

(Continued)

FOREIGN PATENT DOCUMENTS

| EP | 2 385 217 A2 | 11/2011 |
| GB | 1121194 A | 7/1968 |

OTHER PUBLICATIONS

Jul. 7, 2015 Search Report issue in European Application No. 15 15 2087.
(Continued)

*Primary Examiner* — David E Sosnowski
*Assistant Examiner* — Wayne A Lambert
(74) *Attorney, Agent, or Firm* — Oliff PLC

(57) ABSTRACT

A rotor for a turbo-machine, the rotor having a rotational axis and circumferentially spaced-apart radially extending blades of aerofoil configuration, each blade having a suction side, an oppositely directed pressure side, and a pair of oppositely directed snubbers each of which extends from a respective side towards a circumferentially adjacent blade and presents an abutment surface for abutment with the abutment surface of a respective adjacent snubber extending from the adjacent blade. Each snubber is configured such that its abutment surface makes an acute snubber angle to the axis of rotation. At least one pair of adjacent snubbers are configured such that their abutment surfaces are at an equal first snubber angle, with all of the other snubbers being configured such that their abutment surfaces are at equal second snubber angles. The first snubber angle is larger than the second snubber angle.

11 Claims, 4 Drawing Sheets

(51) Int. Cl.
*F04D 29/66* (2006.01)
*B23P 15/00* (2006.01)

(52) U.S. Cl.
CPC ......... *F04D 29/666* (2013.01); *F04D 29/668* (2013.01); *F05D 2250/38* (2013.01); *F05D 2260/96* (2013.01); *Y10T 29/49318* (2015.01)

(58) Field of Classification Search
CPC ...... F04D 29/66; F04D 29/661; F04D 29/666; F04D 29/668; F05D 2250/38; F05D 2260/96; F05D 2260/961; F05D 2260/962; F05D 2260/963; Y10T 29/49318; Y10T 29/49321; B23P 15/006
See application file for complete search history.

(56) References Cited

U.S. PATENT DOCUMENTS

| | | | | |
|---|---|---|---|---|
| 3,477,795 A | | 11/1969 | Beesley | |
| 3,837,761 A | * | 9/1974 | Brown | F01D 5/22 416/191 |
| 4,257,741 A | * | 3/1981 | Betts | B22F 7/064 228/122.1 |
| 4,326,836 A | * | 4/1982 | Fitton | F01D 5/22 416/196 R |
| 4,798,519 A | * | 1/1989 | Zipps | F01D 5/22 416/190 |
| 5,137,426 A | * | 8/1992 | Rhoda | C23C 4/02 416/191 |
| 5,460,488 A | * | 10/1995 | Spear | F01D 5/22 416/191 |
| 5,511,948 A | | 4/1996 | Suzuki et al. | |
| 5,667,361 A | | 9/1997 | Yaeger et al. | |
| 5,829,955 A | * | 11/1998 | Saito | F01D 5/141 416/191 |
| 6,241,471 B1 | * | 6/2001 | Herron | F01D 5/147 415/173.1 |
| 6,341,941 B1 | * | 1/2002 | Namura | F01D 5/16 416/190 |
| 7,182,577 B2 | * | 2/2007 | Yamashita | F01D 5/225 29/889.21 |
| 7,758,311 B2 | * | 7/2010 | Loehle | F01D 5/22 416/196 R |
| 2002/0057969 A1 | * | 5/2002 | Namura | F01D 5/16 416/238 |
| 2004/0165989 A1 | * | 8/2004 | Caruso | F01D 5/3007 416/220 R |

OTHER PUBLICATIONS

Oct. 2, 2014 Search Report issued in British Patent Application No. 1403072.0.

* cited by examiner

ROTOR FOR A TURBO-MACHINE AND A RELATED METHOD

The present invention relates to a rotor for a turbo-machine, and to a related method. More particularly, the method of the present invention involves the modification of a standard turbo-machine rotor.

Although some modern turbo-machines, such as aeronautical gas turbine engines, incorporate rotors in the form of fans having hollow fan blades with a large chord dimension to provide improved flow, higher efficiency and reduced noise, many gas turbine engines in operation today still have older style solid blades which generally have a smaller chord dimension. Solid blades of this type often include the provision of mid-span support to prevent aerodynamic instability during operation of the fan. This mid-span support is typically provided in the form of a series of so-called "snubbers" (also sometimes referred to as a "clappers", but hereinafter referred to solely as snubbers). Such an arrangement involves the provision of a pair of snubbers on each blade in the fan, with each snubber extending outwardly from a respective opposite surface of the fan blade at a position approximately mid-way along the radial length of the blade. When the fan is assembled, each snubber extends towards the circumferentially adjacent blade so as to abut the adjacent snubber, the abutting snubbers thereby providing support to the blades which is effective to resist axial twisting of the blades during rotation of the fan. Snubbers also have the effect of raising the natural frequencies of the blades and provide a damping function. Snubbers are may also be used to provide a similar support effect to the blades of compressor rotors.

Each snubber in a rotor presents a planar abutment surface which lies at an acute angle to the rotational axis of the rotor. All snubbers in a conventional rotor have their abutment surfaces arranged at an equal acute angle to the rotational axis of the rotor so as to provide rotational symmetry around the rotor.

In order to work effectively, it is important that abutting snubbers in the rotor are allowed to slide relative to one another at the interface of their abutment surfaces. Problems have been known to arise if this sliding motion between abutting snubbers is either too restricted or too free. The precise angle at which the snubber abutment faces lie relative to the rotational axis of the rotor is therefore a very important design characteristic for any given rotor.

The concept of snubber "hard lock-up" is known in the field of snubbered rotors, and can arise where the snubbers in a rotor are not allowed to slide sufficiently freely relative to one another, which can cause all of the snubbers in the rotor to lock-up relative to one another, and which can, in turn, cause a dangerous increase in the stresses applied to the rotor blades. By increasing the angle of each snubber abutment face to the rotational axis of the rotor, the snubbers can be made to slide more freely relative to one another, thereby reducing the risk of snubber lock-up occurring. However, increasing the snubber angles in this manner comes with its own disadvantages because increasing the angle can impact on the resonant frequencies of the rotor blades and can give rise to excessive sliding between abutting snubbers which can cause overheating of the snubber abutment surfaces and potential chipping of the surfaces. Other ways to reduce the risk of snubber lock-up include the application of lubrication between the abutment faces of adjacent snubbers. However this solution is considered less than ideal because it is maintenance reliant.

It is therefore considered desirable to provide a snubbered rotor for a turbo-machine, such as a gas turbine engine, which is less susceptible to snubber lock-up. It is also considered desirable to provide a method by which a conventional snubbered rotor can be modified so as to reduce its susceptibility to snubber lock-up.

One object of the present invention is to provide an improved rotor for a turbo-machine.

Another object of the present invention is to provide an improved method of modifying a rotor for a turbo-machine.

According to a first aspect of the present invention, there is provided rotor for a turbo-machine, the rotor having a rotational axis and a plurality of circumferentially spaced-apart radially extending blades of aerofoil configuration, each blade having a suction side, an oppositely directed pressure side, and a pair of oppositely directed snubbers each of which extends from a respective said side towards a circumferentially adjacent blade and presents an abutment surface for abutment with the abutment surface of a respective adjacent snubber extending from the adjacent blade; each snubber in the rotor being configured such that its abutment surface makes an acute snubber angle to the axis of rotation, wherein at least one pair of adjacent snubbers are configured such that their abutment surfaces are at an equal first snubber angle, and all of the other snubbers are configured such that their abutment surfaces are at equal second snubber angles, said first and second snubber angles being different.

Conveniently, only one pair of adjacent snubbers are configured such that their abutment surfaces are at said first snubber angle.

Advantageously, said first snubber angle is larger than said second snubber angle.

Optionally, said first snubber angle is between 1 and 10 degrees larger than said second snubber angle.

Conveniently, said first snubber angle is 5 degrees larger than said second snubber angle.

Advantageously, each said abutment surface is planar.

Optionally, the rotor is provided in the form of a propulsive fan for a ducted-fan gas turbine engine.

Alternatively, the rotor is provided in the form of a compressor rotor for a gas turbine engine.

According to a second aspect of the present invention, there is provided a gas turbine engine having a rotor as defined above.

According to a third aspect of the present invention, there is provided a method of modifying a turbo-machine rotor of a type having a rotational axis and a plurality of circumferentially spaced-apart radially extending blades of aerofoil configuration, each blade having a suction side, an oppositely directed pressure side, and a pair of oppositely directed snubbers each of which extends from a respective said side towards a circumferentially adjacent blade and presents an abutment surface for abutment with the abutment surface of a respective adjacent snubber extending from the adjacent blade; the snubbers in the rotor prior to modification all being configured such that their abutment surfaces make an equal acute snubber angle to the axis of rotation, the method comprising the steps of: removing a circumferentially adjacent pair of said blades from the rotor and replacing them with respective replacement blades, one of said replacement blades having a modified snubber extending from its suction side, and the other replacement blade having a modified snubber extending from its pressure side, wherein said replacement blades are installed in the rotor such that their modified snubbers present respective abutment surfaces for abutment with one another, with the abutment surface of each modified snubber making an equal modified acute snubber angle to the axis of rotation, said modified snubber angle being different to the snubber angle of all other snubbers in the rotor.

Conveniently, the method involves the replacement of only a single pair of blades in the rotor.

Advantageously, the modified snubbers of said replacement blades are configured such that when said replacement blades are installed in the rotor said modified snubber angle is larger than the snubber angle of all other snubbers in the rotor.

Optionally, the modified snubbers of said replacement blades are configured such that when said replacement blades are installed in the rotor said modified snubber angle is between 1 and 10 degrees larger than the snubber angle of all other snubbers in the rotor.

Conveniently, the modified snubbers of said replacement blades are configured such that when said replacement blades are installed in the rotor said modified snubber angle is 5 degrees larger than the snubber angle of all other snubbers in the rotor.

The above-defined method may be performed on a rotor in the form of a propulsive fan for a ducted-fan gas turbine engine.

Alternatively, the method may be performed on a rotor in the form of a compressor rotor for a gas turbine engine.

So that the invention may be more readily understood, and so that further features thereof may be appreciated, embodiments of the invention will now be described by way of example with reference to the accompanying drawings in which.

Turning now to consider the drawings in more detail, and embodiment of the present invention will be described. However, it is to be noted that whilst the invention is described below with particular reference to a rotor in the form of a propulsive fan for a ducted-fan gas turbine engine, the invention can also be embodied in rotors of other configurations and for use in other types of turbo-machine. For example, the invention could be applied to a compressor rotor in a gas turbine engine.

Figure 1:
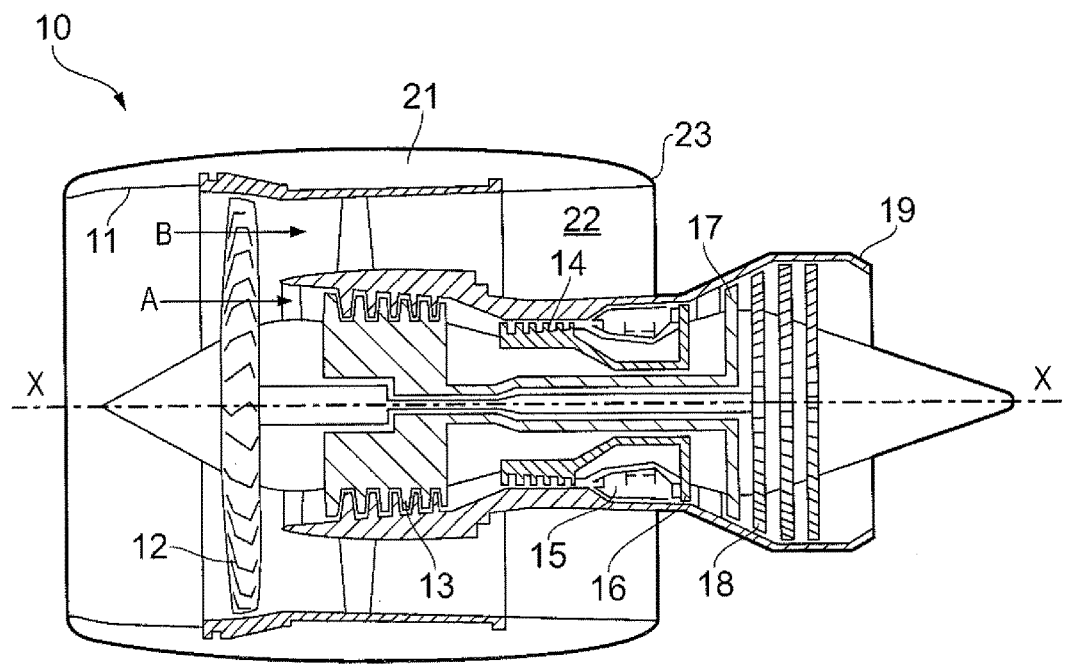
FIG. 1 is a schematic longitudinal cross-sectional view through a turbo-machine in the form of a ducted-fan gas turbine engine.

With reference to FIG. 1, a ducted fan gas turbine engine is generally indicated at 10 and has a principal and rotational axis X-X. The engine comprises, in axial flow series; an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2:
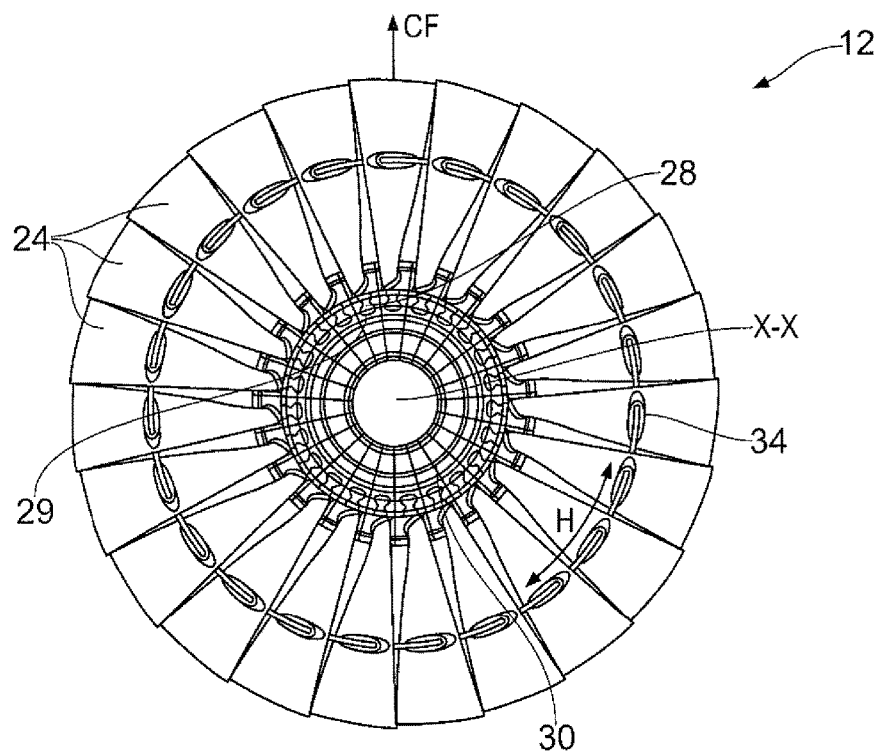
FIG. 2 is a schematic view of the fan of the engine illustrated in FIG. 1, showing the fan as viewed from the front of the engine along the rotational axis of the fan.

FIG. 2 shows the fan 12 of the engine 10 in more detail. However, as indicated above the fan 12 is used merely to represent an exemplary rotor of the engine, which could instead be embodied as a compressor rotor or even a turbine rotor.

Figure 3:
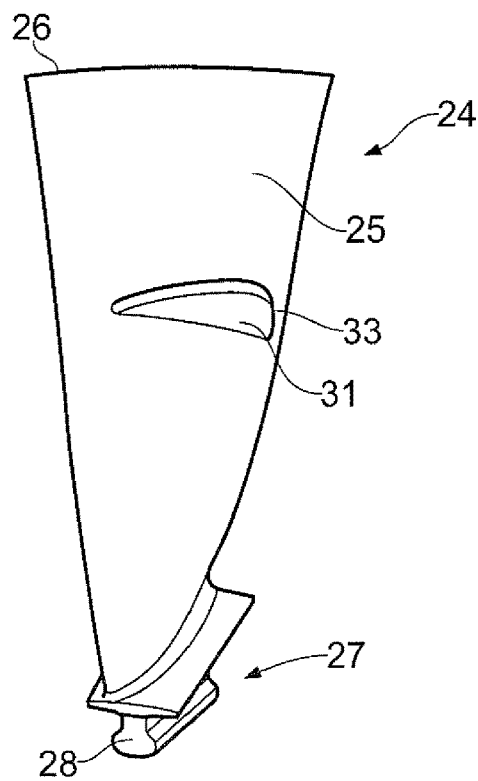
FIG. 3 is a perspective view showing a snubbered fan blade.

FIG. 2 shows the fan rotor's arrangement of circumferentially spaced-apart radially extending blades 24, one of which is illustrated in more detail in FIG. 3. As will be noted, each rotor blade 24 has an aerofoil configuration comprising a suction side 25 and an oppositely directed pressure side 26 in a conventional manner. A root portion 27 of each rotor blade includes a slider foot 28 which is slidingly engaged in a corresponding axially orientated channel 29 in the hub 30 of the rotor to mount the blade 24 as illustrated in FIG. 2. The rotor 12 is mounted in the engine for rotation about the engine's principal rotational axis X-X.

As will be recognised by those of skill in the art, the rotor blades 24 illustrated in FIGS. 2 and 3 are of a so-called snubbered type, with each blade 24 having a pair of oppositely directed snubbers 31, 32 (only one being visible in FIG. 3), each of which extends outwardly from a respective side 25, 26 of the blade 24. Each snubber defines a generally straight and optionally generally planar abutment surface 33.

Figure 4:
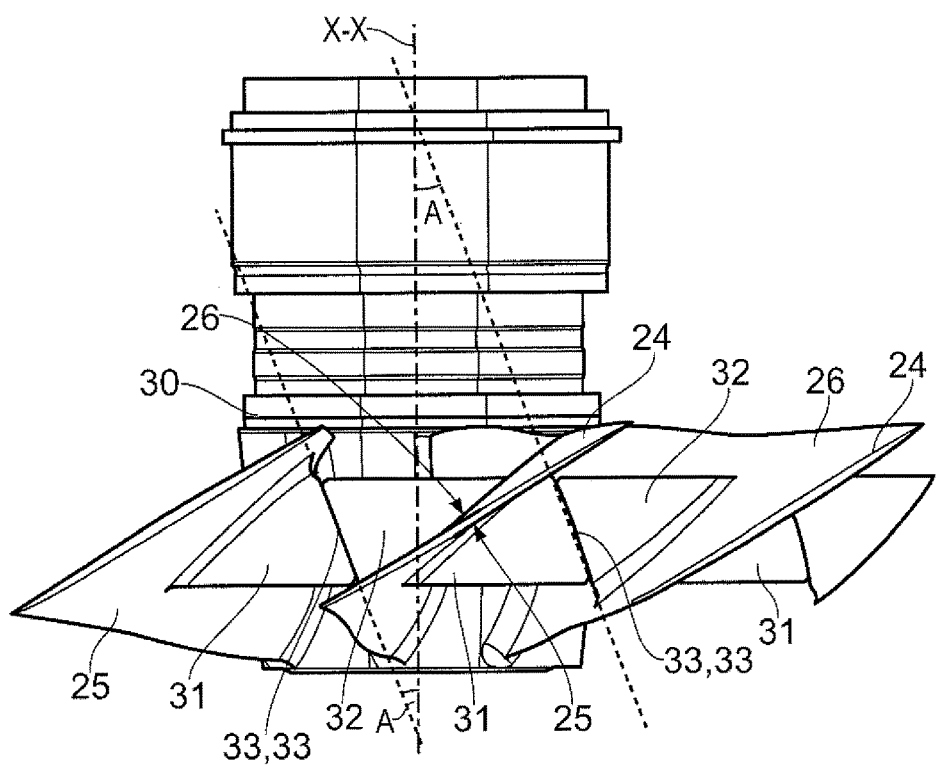
FIG. 4 is a schematic illustration showing the abutting relationship of adjacent snubbers in a conventional unmodified fan, as viewed generally radially inwardly towards the centre of the fan.

As illustrated in FIG. 4, the snubber 31 extending outwardly from the suction side 25 of each rotor blade 24 extends towards the circumferentially adjacent rotor blade 24 such that its abutment surface 33 is presented for abutment with the abutment surface 33 of the snubber 32 extending outwardly from the pressure side 26 of the adjacent blade 24. Similarly, the snubber 32 extending outwardly from the pressure side 26 of each rotor blade 24 extends towards the circumferentially adjacent rotor blade 24 on the other side such that its abutment surface 33 is presented for abutment with the abutment surface 33 of the snubber 31 extending outwardly from the suction side 25 of the adjacent blade 24. As illustrated in FIG. 2, the abutting snubbers 31, 32 between each pair of adjacent blades 24 in the rotor 12 serve to define a snubber ring 34 extending all of the way around the rotor 12.

FIG. 4 illustrates a conventional snubber arrangement in which the abutment surfaces 33 of all of the snubbers 31, 32 in the rotor make an equal acute angle A to the rotational axis X-X of the rotor 12. One example of a standard angle A for a conventional snubbered rotor 12 is 20 degrees.

Figure 5:
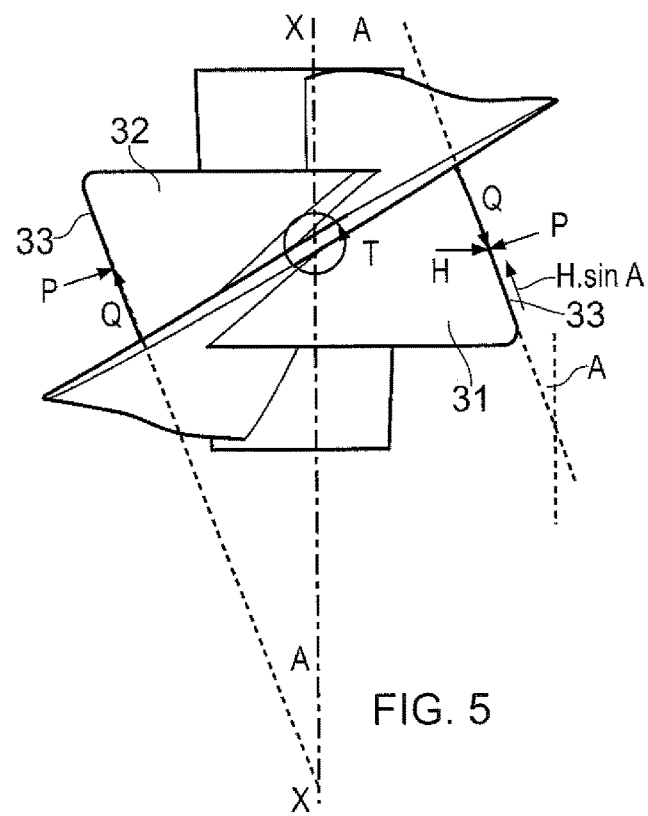
FIG. 5 is a schematic illustration similar to that of FIG. 4, but showing a single fan blade with its two snubbers.

As the rotor 12 rotates during operation of the engine 10, the aerofoil configuration of the blades 24 generates forces tending to twist each blade 24 about its radial axis as illustrated schematically at T in FIG. 5. This twist is prevented by the interaction of the blade's two snubbers 31, 32 with the abutting snubbers of the two adjacent blades 24 in the rotor, such that a normal contact force P and a shear force Q is applied to each abutment surface 33 as also illustrated schematically in FIG. 5.

The shear force Q at the abutment surface 33 of each snubber 31, 32 results from friction at the abutment surface, such that the shear force Q is limited by the coefficient of friction μ of the abutment surface 33. In this regard, and as an example, the coefficient of friction μ for un-lubricated abutment faces 33 of tungsten carbide snubbers 31, 32 is 0.36. When Q=μ·P, the abutment surfaces 33 of abutting snubbers 31, 32 will be on the point of sliding relative to one another, and as indicated above a limited degree of sliding movement between abutting snubbers 31, 32 is considered optimal.

During rotation of the rotor a radially outwardly directed centrifugal force CF is applied to each rotor blade 24 as indicated schematically in FIG. 2, the force CF effectively tending to stretch the blades 24 in a radially outwards direction. During deceleration of the rotating rotor 12, the centrifugal force CF will reduce which in turn will result in radial shrinkage of the blades 24. A consequence of this is that the snubber ring 34 will contract radially inwardly. During deceleration, friction at the abutment surfaces 33 of the abutting snubbers 31, 32 may resist smooth sliding of the snubbers relative to one another which creates a hoop load H acting around the snubber ring 34, as indicated schematically on FIG. 2.

The hoop load H is also indicated on FIG. 5, from which it will be understood that the component of the hoop force acting along the abutment surface 33 of each snubber 31, 32 will be equal to H·sin A, as also indicated on FIG. 5.

Given that Q=μP on the point of the abutting snubbers sliding relative to one another, it therefore follows that during deceleration of the rotor: if H·sin A >μP then the snubbers 31, 32 will slide relative to one another, but if H·sin A <μP then the snubbers will stick and lock relative to one another which, as indicated above, can cause very serious risk of damage to the rotor 12. The angle A at which the abutment surfaces 33 of the snubbers 31, 32 lie relative to the rotational axis X-X of the rotor therefore plays an important role in determining the onset of snubber lock-up throughout the rotor 12.

It has been found through experiment on standard rotors 12 having un-lubricated tungsten carbide snubbers whose snubber abutment faces 33 are arranged at an angle A of 20 degrees to the rotational axis A, that the snubbers abutment faces 33 are right on the point of lock/slide at such an angle. The critical coefficient for friction for the abutment surfaces can thus be considered to be 0.36 at angle A of 20 degrees. Increasing the angle A will have the effect of increasing the likelihood of sliding movement occurring between abutting snubbers 31, 32 at their abutment surfaces 33. In this regard, it has been found through experiment that by increasing the snubber angle from 20 degrees to 25 degrees, the critical coefficient of friction at which lock-up occurs increases to approximately 0.47 which is well above the actual coefficient of friction for un-lubricated tungsten carbide, which means that increasing the snubber angle from 20 degrees to 25 degrees would avoid the likelihood of snubber lock-up occurring.

However, as already mentioned above, increasing the angle A of the abutment surfaces 33 of the snubbers 31, 32 throughout the rotor 12 can, in itself, be disadvantageous because it can impact on the resonant frequencies of the rotor blades and can give rise to excessive sliding between abutting snubbers 31, 32 which can cause overheating of the snubber abutment surfaces and potential chipping of the surfaces 33.

However, the present invention addresses the problem of snubber lock-up in a manner that avoids the significant problems associated with increasing the snubber angle A of each and every snubber 31, 32 in the rotor 12. The present invention is predicated on the surprising discovery that by increasing the angle A of only one pair of abutting snubbers 31, 32 in the entire rotor 12, hard lock-up of the entire snubber ring 34 can be avoided.

Figure 6:
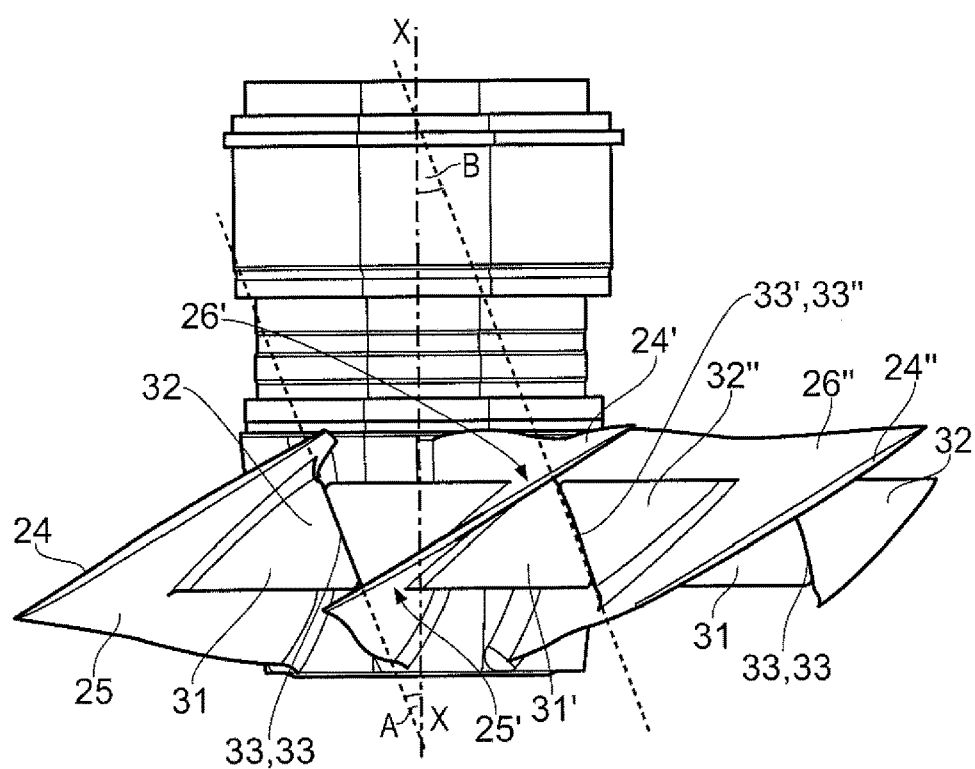
FIG. 6 is a schematic illustration similar to that of FIG. 4, but which shows part of a rotor in accordance with the present invention.

FIG. 6 shows a series of three circumferentially adjacent rotor blades 24 of a rotor 12 embodying the present invention. The leftmost rotor blade 24 (as illustrated) is a blade of standard form and thus is identical to the blades 24 of the rotor 12 discussed above and has identically configured snubbers 31 to those described above. Accordingly, the snubber 31 which extends from the suction side 25 of the standard blade 24 makes a standard acute angle A to the rotational axis X-X of the rotor. However, the other two blades 24', 24" illustrated in FIG. 6 are of a modified configuration and have differently configured snubbers to those of the standard blade 24.

The first modified blade 24' is represented in FIG. 6 by the central blade in the series of three which are shown. The first modified blade 24' has an identical suction side 25' and an identical pressure side 26'. The snubber 32 extending outwardly from the pressure side 26' of the first modified blade 24' is also of standard configuration and hence presents an abutment surface 33 at the standard acute angle A to the rotational axis X-X for abutment with the adjacent snubber of the standard blade 24 in the standard manner. However, the snubber 31' which extends outwardly from the suction side 25' of the first modified blade 24' is configured such that its abutment surface 33' makes an acute angle B to the rotational axis X-X which is larger than angle A.

The second modified rotor blade 24" also has identical suction and pressure sides 25", 26" to the standard blade 24. The snubber 31 extending outwardly from the suction side 25" of the second modified blade 24" is also of standard configuration and thus presents an abutment surface 33 at the standard acute angle A to the rotational axis X-X for abutment with the adjacent snubber 32 of the next standard blade (not shown in FIG. 6) around the fan 12. However, the snubber 32" which extends outwardly from the pressure surface 26" of the second modified blade 24" is configured such that its abutment surface 33" makes an acute angle B to the rotational axis X-X which is equal to the snubber angle B of the adjacent snubber 31' of the first modified blade 24' and thus larger than the standard angle A. It is envisaged that the adjacent and abutting snubbers 31', 32" of the two modified rotor blades 24', 24" will be the only snubbers in the entire rotor 12 whose abutment surfaces are arranged at the larger angle B to the rotational axis X-X, with all other snubbers in the fan having their abutment surfaces arranged at the smaller standard angle A.

It has been found that by increasing the snubber angle B for only one pair of adjacent and abutting snubbers 31', 32" in the entire rotor 12 as described above, the increased slippage between their abutment surfaces 33', 33" arising from the increased angle B permits sufficient radial shrinkage of the entire snubber ring 34 during deceleration of the rotor 12, thereby significantly reducing the likelihood of the entire snubber ring 34 becoming locked up such that all abutting snubbers 31, 32 in the ring no longer slide relative to one another. In the exemplary rotor 12 described above having un-lubricated tungsten carbide snubbers, it is proposed that the larger angle B for the modified snubbers 31', 32" may be 5 degrees larger than the angle A for all of the other snubbers in the rotor, such that A=20 degrees and B=25 degrees.

Figure 7:
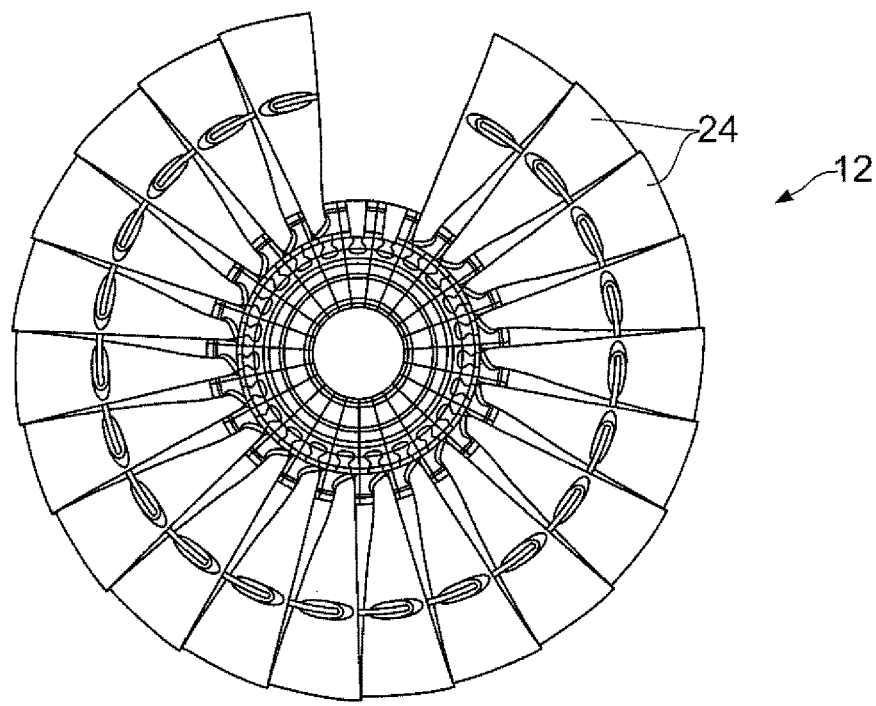
FIG. 7 is a view similar to that of FIG. 2, but which shows an initial step in the method of the present invention.
Figure 8:
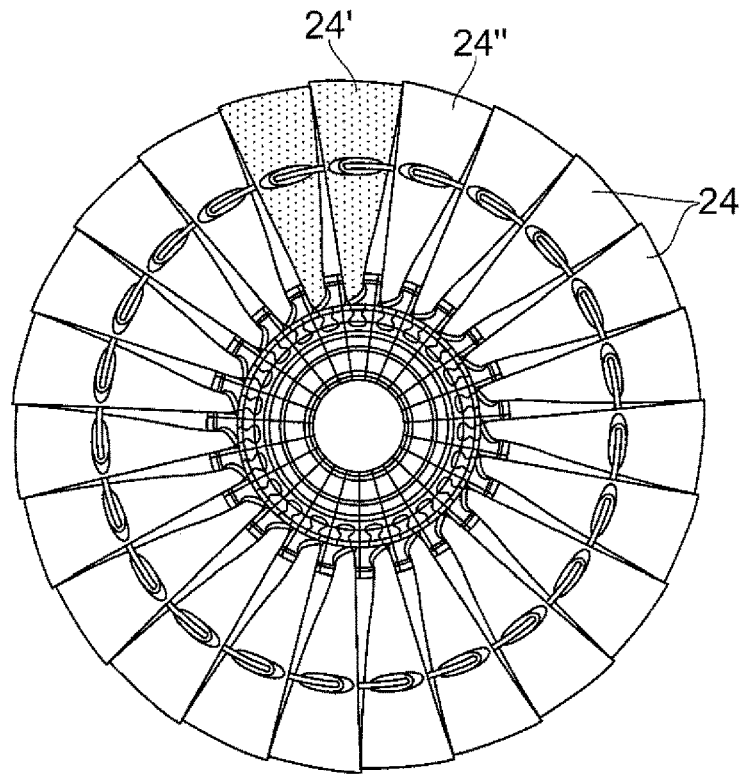
FIG. 8 is a view similar to that of FIG. 7, showing a complete fan as modified by the method of the present invention.

Furthermore, because only two adjacent and abutting snubbers 31', 32" in the entire rotor 12 need to have their abutment surfaces 33', 33" arranged at the larger modified angle B to the rotational axis X-X of the rotor 12 in order for the rotor 12 to benefit from the present invention, a standard rotor 12 having all of its snubbers abutment surfaces 33 arranged at the standard angle A to the axis X-X can easily be modified by simply removing an adjacent pair of its standard blades 24 and replacing them with a pair of modified blades 24', 24" of the type described above. FIG. 7 illustrates a standard rotor 12 after removal of an adjacent pair of its standard blades 24 in this manner, and FIG. 8 illustrates the rotor 12 modified in accordance with the present invention by the installation of a pair of modified blades 24', 24" of the type described above to replace the removed blades 24.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A rotor for a turbo-machine, the rotor having a rotational axis and comprising:
    a plurality of circumferentially spaced-apart and radially extending blades of aerofoil configuration,
        each blade having a suction side and an oppositely directed pressure side,
        each blade having a pair of oppositely directed snubbers that each extends from a respective side of the blade towards a circumferentially adjacent blade, the snubbers each providing an abutment surface for abutment with the abutment surface of a respective adjacent snubber extending from the adjacent blade,
        each snubber being configured such that the abutment surface of each snubber forms an acute snubber angle with the rotational axis, and
        only one pair of adjacent snubbers being configured such that the abutment surfaces of the only one pair of adjacent snubbers are at an equal first snubber angle, and all of the remaining snubbers being configured such that the abutment surfaces of the remaining snubbers are at equal second snubber angles, the first snubber angle is between 1 and 10 degrees greater than the second snubber angle.

2. The rotor according to claim 1, wherein the first snubber angle is 5 degrees greater than the second snubber angle.

3. The rotor according to claim 1, wherein each abutment surface is planar.

4. The rotor according to claim 1, wherein the turbo-machine is provided in the form of a propulsive fan for a ducted-fan gas turbine engine.

5. The rotor according to claim 1, wherein the rotor is provided in the form of a compressor rotor for a gas turbine engine.

6. A gas turbine engine having a rotor according to claim 1.

7. A method of modifying a turbo-machine rotor of a type having a rotational axis and a plurality of circumferentially spaced-apart radially extending blades of aerofoil configuration,
    each blade having a suction side and an oppositely directed pressure side,
    each blade having a pair of oppositely directed snubbers that each extends from a respective side of the blade towards a circumferentially adjacent blade, the snubbers each providing an abutment surface for abutment with the abutment surface of a respective adjacent snubber extending from the adjacent blade, and
    each snubber, prior to modification, being configured such that the abutment surface of each snubber forms an equal acute snubber angle with the rotational axis,
    the method comprising the steps of:
        removing only one circumferentially adjacent pair of the blades from the rotor and replacing the pair of blades with respective replacement blades, a first replacement blade of the replacement blades having a first modified snubber extending from the suction side of the first replacement blade, and a second replacement blade of the replacement blades having a second modified snubber extending from the pressure side of the second replacement blade,
        wherein the first and second replacement blades are installed in the rotor such that the first modified snubber and the second modified snubber provide respective abutment surfaces for abutment with one another, the abutment surface of the first modified snubber and the abutment surface of the second modified snubber both forming an equal modified acute snubber angle with the axis of rotation, the modified snubber angle being between 1 and 10 degrees greater than the snubber angle of all the remaining snubbers in the rotor.

8. The method according to claim 7, wherein the method includes replacing only a single pair of blades in the rotor.

9. The method according to claim 7, wherein the modified snubber angle is 5 degrees larger than the snubber angle of all the remaining snubbers in the rotor when the replacement blades are installed in the rotor.

10. The method according to claim 7, wherein the method is performed on a rotor in the form of a propulsive fan for a ducted-fan gas turbine engine.

11. The method according to claim 7, wherein the method is performed on a rotor in the form of a compressor rotor for a gas turbine engine.

* * * * *